US010150467B2

(12) United States Patent
McCullough et al.

(10) Patent No.: US 10,150,467 B2
(45) Date of Patent: Dec. 11, 2018

(54) CONTROL OF TRANSMISSION DURING REGENERATIVE BRAKING

(71) Applicant: Ford Global Technologies, LLC, Dearborn, MI (US)

(72) Inventors: Todd McCullough, Bloomfield Hills, MI (US); Bernard D. Nefcy, Novi, MI (US); Stuart N. Ford, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 15/403,813

(22) Filed: Jan. 11, 2017

(65) Prior Publication Data
US 2018/0194342 A1    Jul. 12, 2018

(51) Int. Cl.
*B60L 9/00* (2006.01)
*B60W 20/30* (2016.01)
*B60L 7/10* (2006.01)
*B60L 11/14* (2006.01)
*B60K 6/54* (2007.10)

(52) U.S. Cl.
CPC ............... *B60W 20/30* (2013.01); *B60K 6/54* (2013.01); *B60L 7/10* (2013.01); *B60L 11/14* (2013.01); *B60L 2240/486* (2013.01); *B60L 2240/507* (2013.01); *B60W 2510/1005* (2013.01); *B60W 2510/1025* (2013.01); *B60W 2710/02* (2013.01); *B60Y 2300/18125* (2013.01); *B60Y 2300/42* (2013.01); *Y10S 903/917* (2013.01); *Y10S 903/946* (2013.01)

(58) Field of Classification Search
CPC ......... B60W 20/30; B60W 2510/1005; B60W 2510/1025; B60W 2710/02; B60K 6/54; B60L 7/10; B60L 11/14; B60L 2240/486; B60L 2240/507; B60Y 2300/18125; B60Y 2300/42; Y10S 903/917; Y10S 903/946
USPC ............................ 701/22; 477/3, 5; 180/65.2
See application file for complete search history.

(56) References Cited

U.S. PATENT DOCUMENTS

| 8,346,489 | B2 * | 1/2013 | McGrogan | B60K 6/445 702/41 |
| 2008/0125264 | A1 * | 5/2008 | Conlon | B60K 6/365 475/5 |
| 2014/0080648 | A1 * | 3/2014 | Kimes | B60K 6/543 475/5 |

(Continued)

FOREIGN PATENT DOCUMENTS

WO    2016016390 A1    2/2016

*Primary Examiner* — Shardul D Patel
(74) *Attorney, Agent, or Firm* — David B. Kelley; Brooks Kushman P.C.

(57) ABSTRACT

A hybrid vehicle includes an engine, an electric machine, a transmission, and a controller. The transmission is configured to alter clutch pressures in preparation for an upcoming shift between discrete gear ratios (e.g., input-to-output ratio). For example, the clutch pressures may spike to a heightened magnitude to prepare for the upcoming shift. The electric machine is configured to selectively propel the vehicle and perform regenerative braking. If regenerative braking demands occur during the clutch pressures being heightened during shift preparation, the controller is programmed to stop the preparing of the clutches. This can be done by reducing the clutch pressures back to their pre-preparation magnitude. The upcoming shift can be cancelled or delayed.

20 Claims, 2 Drawing Sheets

(56) References Cited

U.S. PATENT DOCUMENTS

| | | | |
|---|---|---|---|
| 2015/0360691 A1* | 12/2015 | Nefcy | B60W 30/18127 |
| | | | 701/22 |
| 2016/0046280 A1* | 2/2016 | Lee | B60W 20/30 |
| | | | 701/22 |
| 2016/0059705 A1* | 3/2016 | Kim | B60L 7/18 |
| | | | 701/22 |
| 2016/0194008 A1* | 7/2016 | Nefcy | B60W 30/18127 |
| | | | 701/22 |
| 2016/0236671 A1* | 8/2016 | Imamura | B60W 20/14 |

* cited by examiner

CONTROL OF TRANSMISSION DURING REGENERATIVE BRAKING

TECHNICAL FIELD

This disclosure relates to a control strategy for controlling the operation of a transmission while a vehicle is performing regenerative braking. In particular, the control strategy accounts for reduction in braking demands during the regenerative braking.

BACKGROUND

Hybrid vehicles can be propelled by two power sources—an internal combustion engine, and an electric motor powered by a battery. Certain electric motors can also function as a generator to convert mechanical energy into electric energy to be stored in the battery. One way of operating the electric motor as a generator is through regenerative braking, in which the motor provides a negative torque to the powertrain by converting the kinetic energy of the vehicle into electric energy stored in the battery to brake the vehicle. During regenerative braking, shift events in the vehicle's transmission may be scheduled to keep the electric motor in an optimal speed range for energy capture.

SUMMARY

According to one embodiment, a hybrid vehicle includes an engine, and a transmission configured to alter clutch pressures in preparing clutches for an upcoming shift between discrete gear ratios. An electric machine (e.g., a motor/generator) is selectively coupled to the engine and to the transmission, and is configured to both propel the vehicle and perform regenerative braking, selectively. A controller is programmed to stop the preparing of the clutches in response to a reduction in regenerative braking demand occurring while the clutch pressures are being altered in preparation for the upcoming shift.

The controller may be further programmed to return hydraulic pressure in the clutches to a magnitude that was present prior to the preparing in response to the reduction in regenerative braking demand during the preparation.

The controller may be further programmed to maintain hydraulic pressure in the clutches in response to the reduction in regenerative braking demand being below a threshold.

The preparing of the clutches prior to the shifting may include initiating a sudden spike or "boost" of hydraulic pressure at the clutch, followed by a maintaining of that clutch pressure at its boosted magnitude. Once the clutch is engaged, the clutch pressure can be relieved back below its boosted magnitude.

In another embodiment, a hybrid vehicle includes an electric machine configured to selectively perform regenerative braking. A transmission is configured to alter clutch pressures in preparing clutches for an upcoming shift. A controller is programmed to (i) in response to a reduction in regenerative braking demand occurring during the preparing, stop the preparing, and (ii) in response to the reduction in regenerative braking demand occurring after the preparing is complete, limit a rate of reduction of transmission input torque.

In another embodiment, a method of controlling a transmission during regenerative braking in a vehicle is provided. The method is accomplished by a controller, an embodiment of which is described in detail below. The method includes preparing the transmission for a shift by increasing clutch pressure in an oncoming clutch and reducing clutch pressure in an off-going clutch prior to the shift. The method includes then canceling the preparing in response to a reduction in regenerative braking demand occurring during the preparing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
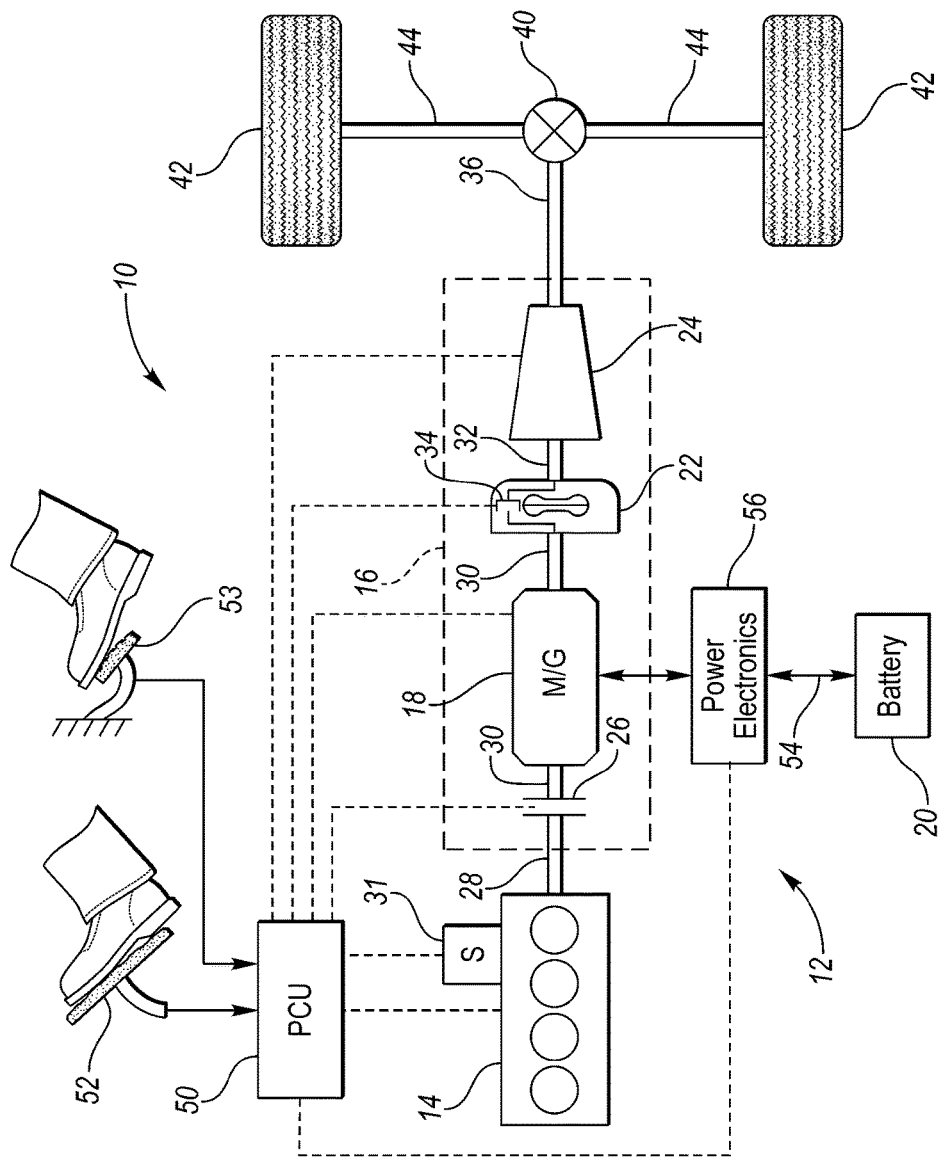
FIG. 1 is a schematic of a hybrid electric vehicle, according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The engine 14, M/G 18, torque converter 22, and the automatic transmission 16 are connected sequentially in series, as illustrated in FIG. 1.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine to the M/G to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 53 is also provided. In general, depressing and releasing the brake pedal 53 generates a brake pedal position signal that may be interpreted by the controller 50 as a demand for an increase or decrease in the amount of brake power. The corresponding braking power can be provided by friction (e.g., hydraulic) braking, regenerative braking, or a combination of the two.

Based at least upon input from the pedals 52, 53, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

As briefly described above, regenerative braking may be provided by the M/G 18 in which the M/G 18 acts as a generator during times of braking to capture and transfer rotational energy from spinning wheels 42 via through the gearbox 24. This rotational energy is converted into electrical energy by the M/G 18 for storage in the battery 20, whereupon it can be later used by the M/G 18 as propulsive energy so that the M/G 18 can provide positive torque output. During regenerative braking, shift events in the gearbox 24 are scheduled such that the M/G 18 is kept in an optimal speed range for energy capture. The amount of negative torque (i.e., braking torque) of the M/G 18 is based on the driver brake request, and therefore the amount of negative torque can change rapidly at any time. Once a shift is commanded to occur in the gearbox 24, shifting clutch torques and torque modulation levels are set up according to the current transmission input torque, which corresponds with the torque provided by the M/G 18. A decrease in the requested driver braking torque (i.e., a decrease in braking at the brake pedal 53) can change faster than the control torque on the on-coming and off-going shifting clutches, which can possibly result in a poor shift.

Figure 2:
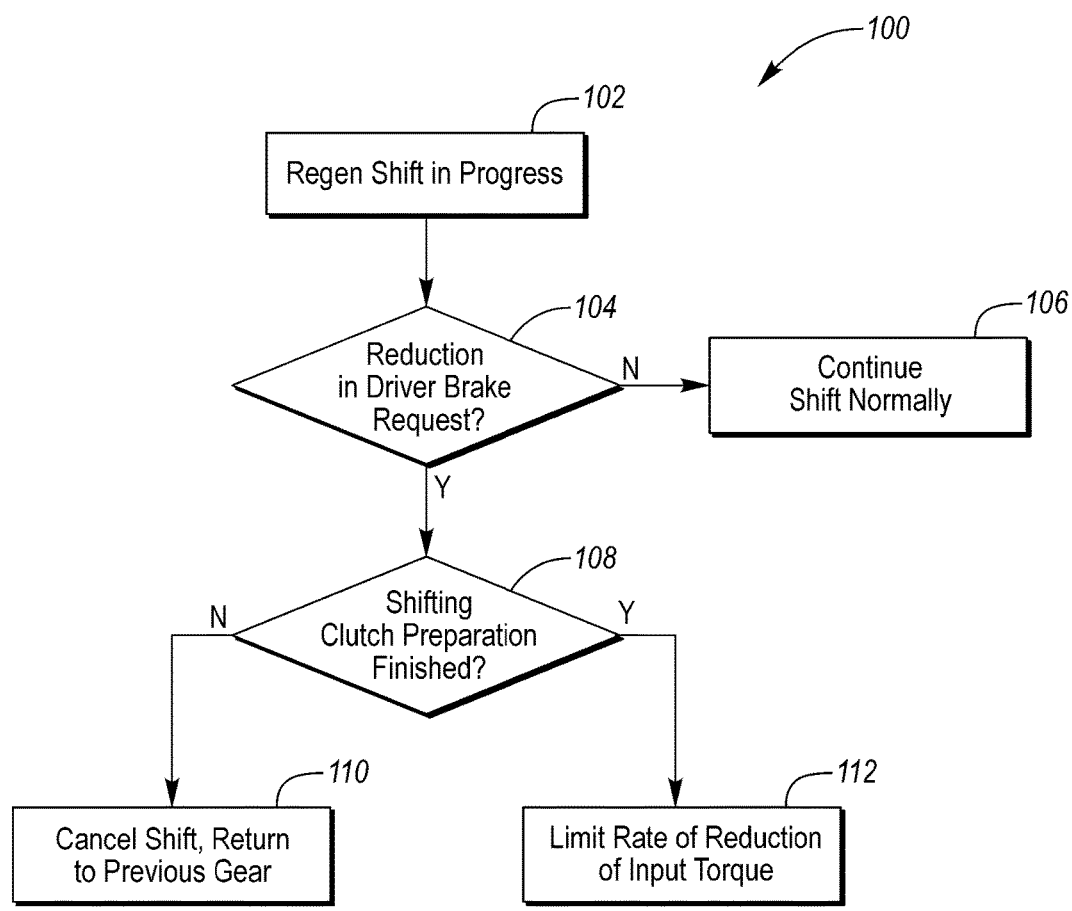
FIG. 2 is a flow chart illustrating an algorithm programmed into a vehicle processor for controlling the transmission, according to one embodiment.

Referring to FIG. 2, an algorithm 100 is illustrated that can be implemented by the controller 50 for improving the shift quality during a regenerative braking event by controlling a decrease in driver braking torque request during the regenerative braking.

At 102, a shift in the transmission gearbox 24 occurs during regenerative braking (e.g., a "regen shift"). The shift is performed, for example, in order to assure that the M/G 18 is kept in an optimal speed range for energy capture, as explained above. At the beginning of a commanded regen shift, an off-going clutch and an oncoming clutch are first prepared for the actual shift. An off-going clutch can prepare for the shift by having its clutch pressure reduced to a level sufficient enough to hold an initial driver torque demand during what is known as a "boost phase." Stroking of an oncoming clutch can prepare the oncoming clutch for the shift by having its clutch pressure increased during what is known as a "start phase." The boost phase, the start phase, and other clutch preparations are explained in further detail in U.S. patent application Ser. No. 14/302,460 (U.S. Publication No. 2015/0360691) which is hereby incorporated by reference in its entirety. These are but some examples of how the oncoming and off-going clutches can be prepared for the upcoming change in gear ratio performed in the gearbox 24. To prepare the clutches for the shift, oncoming and off-going clutch torques and torque modulation levels are set up according to the current transmission input torque.

At 104, the controller 50 determines whether or not a reduction in driver brake request is detected during the regen shift. This can be detected by a reduction in application of the brake pedal 53, for example. As explained above, a decrease in requested driver braking torque request can change faster than the control torque on the oncoming and off-going shifting clutches. If there is no reduction in requested driver brake torque, then the transmission is controlled to shift normally at 106. If, however, there is a reduction in requested driver brake torque, then the algorithm proceeds to 108.

At 108, the controller 50 determines whether or not preparations in the oncoming clutch(es) and off-going clutch (es) are finished. The controller 50 can assume the preparations in the oncoming and off-going clutches are finished based on conditions indicating the shift has proceed to a "torque phase," for example, which is described in U.S. patent application Ser. No. 14/302,460.

If the shifting clutch preparation is not finished at 108, then the algorithm proceed to 110 in which the controller cancels the shift and returns the shifting clutches to their previous holding states to return the transmission gearbox to the previous gear. This effectively cancels the shift preparation and maintains the gear ratio that was in effect prior to step 102. The term "cancelling" can mean that the changes in pressures at the clutches are halted, allowing the pressures to either remain where they are or return to their previous clutch pressure magnitudes prior to the clutch preparation. Once the requested braking torque levels are steadied, or once the driver has stopped reducing the braking torque demands, or once the driver has removed the regenerative braking demand altogether, the algorithm can return to step 102 in which another attempt to prepare clutches and shift the transmission is performed. Because the shift is commanded in order to maintain optimal electric machine efficiency in the M/G 18, as opposed to a hard limitation such as engine RPMs or battery SOC, there is room for flexibility in cancelling the shift preparations and delaying the shifts.

The controller 50 can also react differently depending on the amount of the decrease in driver braking torque requests. For example, if the amount of the decrease in driver braking torque request at 104 is below a threshold, the performing of the shift can be delayed by holding the off-going and oncoming clutches at their clutch torque levels when the reduction of driver braking torque request is realized. In other words, if a reduction in driver brake requests at 104 is small and the shifting clutches are not finished preparing for the shift, then the shifting clutches can be held at their then-present clutch torques; the shift can resume once the reduction in driver brake requests is stopped or steadied.

Conversely, if the amount of the decrease in driver braking torque request at 104 exceeds the threshold, then the performing of the shift can be cancelled by returning the clutch torques in the shifting clutches to the magnitude of clutch torques that were present prior to the regen shift at 102.

If the shifting clutch preparation is finished at 108, then the algorithm proceeds to 112 in which the controller 50 limits a rate of reduction of the transmission input torque. The transmission input torque can be reduced by reducing the output torque of the M/G 18, for example. The reduction of the input torque can be limited to a reduction rate such that the shifting clutches can be controlled through feedforward adjustments. The shift can be completed such that the transmission now operates with a different gear ratio. After the shift is complete, the limit on the reduction of input torque can be removed to allow the torque to return to the driver demand.

It should be understood that the strategies explained above can be for an upshift in the transmission, or a downshift in the transmission. These control strategies improve the quality of transmission shifting during regenerative braking, specifically during a decrease in driver braking torque requests.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hybrid vehicle comprising:
    an engine;
    a transmission configured to stroke clutch pressures prior to shifting between discrete gear ratios;
    an electric machine selectively coupled to the engine and to the transmission, and configured to selectively propel the vehicle and perform regenerative braking; and
    a controller programmed to cease stroking of the clutches in response to a reduction in regenerative braking demand.

2. The hybrid vehicle of claim 1, wherein the controller is further programmed to return hydraulic pressure in the clutches to a magnitude that was present prior to the stroke of clutch pressures in response to the reduction in regenerative braking demand during the stroke.

3. The hybrid vehicle of claim 1, wherein the controller is further programmed to maintain hydraulic pressure in the clutches in response to the reduction in regenerative braking demand being below a threshold.

4. The hybrid vehicle of claim 3, wherein the controller is further programmed to return the hydraulic pressure in the clutches to a magnitude that was present prior to the stroke of clutch pressures in response to the reduction in regenerative braking demand exceeding the threshold.

5. The hybrid vehicle of claim 1, wherein the controller is further programmed to reattempt another stroke of clutch pressure in response to a ceasing of the reduction in regenerative braking demand.

6. The hybrid vehicle of claim 1, wherein the controller is further programmed to reattempt another stroke of clutch pressure in response to a ceasing of the regenerative braking demand.

7. The hybrid vehicle of claim 1, wherein the controller is further programmed to limit a rate of reduction of transmission input torque in response to the reduction in regenerative braking demand occurring after the stroking is complete.

8. The hybrid vehicle of claim 7, wherein the controller is further programmed to reduce an output torque of the electric machine to reduce the transmission input torque.

9. The hybrid vehicle of claim 1, further comprising a brake pedal, wherein the reduction in regenerative braking demand is indicated by a lifting of the brake pedal.

10. A hybrid vehicle comprising:
    an electric machine configured to selectively perform regenerative braking;
    a transmission configured to alter clutch pressures in preparing clutches for an upcoming shift; and
    a controller programmed to,
        in response to a reduction in regenerative braking demand occurring during the preparing, stop the preparing, and
        in response to the reduction in regenerative braking demand occurring after the preparing is complete, limit a rate of reduction of transmission input torque.

11. The hybrid vehicle of claim 10, wherein the controller is programmed to return hydraulic pressure in the clutches to a magnitude that was present prior to the preparing in response to a reduction in regenerative braking demand occurring during the preparing.

12. The hybrid vehicle of claim 10, wherein the controller is further programmed to maintain hydraulic pressure in the clutches in response to the reduction in regenerative braking demand being below a threshold.

13. The hybrid vehicle of claim 12, wherein the controller is further programmed to return the hydraulic pressure in the clutches to a magnitude that was present prior to the preparing in response to the reduction in regenerative braking demand exceeding the threshold during the preparing.

14. The hybrid vehicle of claim 10, wherein the controller is further programmed to reattempt another preparation of a shift in the transmission in response to a ceasing of the reduction in regenerative braking demand during the preparing.

15. The hybrid vehicle of claim 10, wherein the controller is further programmed to reduce the rate of reduction of transmission input torque in response to the reduction in regenerative braking demand occurring after the preparing is complete.

16. A method of controlling a transmission during regenerative braking in a vehicle, comprising:
    by a controller,
        preparing the transmission for a shift by increasing clutch pressure in an oncoming clutch and reducing clutch pressure in an off-going clutch prior to the shift; and
        canceling the preparing in response to a reduction in regenerative braking demand occurring during the preparing.

17. The method of claim 16, wherein the canceling includes returning the clutch pressures in the oncoming clutch and off-going clutch to magnitudes that were present prior to the preparing in response to the reduction in regenerative braking demand during the preparation.

18. The method of claim 16, wherein the canceling includes maintaining the clutch pressure in the oncoming clutch and the off-going clutch in response to the reduction in regenerative braking demand being below a threshold.

19. The method of claim 18, wherein the canceling includes returning the clutch pressure in the oncoming clutch and the off-going clutch to a magnitude that was present prior to the preparation in response to the reduction in regenerative braking demand exceeding the threshold.

20. The method of claim 16, further comprising limiting a rate of reduction of transmission input torque in response to the reduction in regenerative braking demand occurring after the preparing is complete.

\* \* \* \* \*